Aug. 21, 1934.     D. LOCKWOOD     1,971,075
FLOWERPOT
Filed Sept. 17, 1930
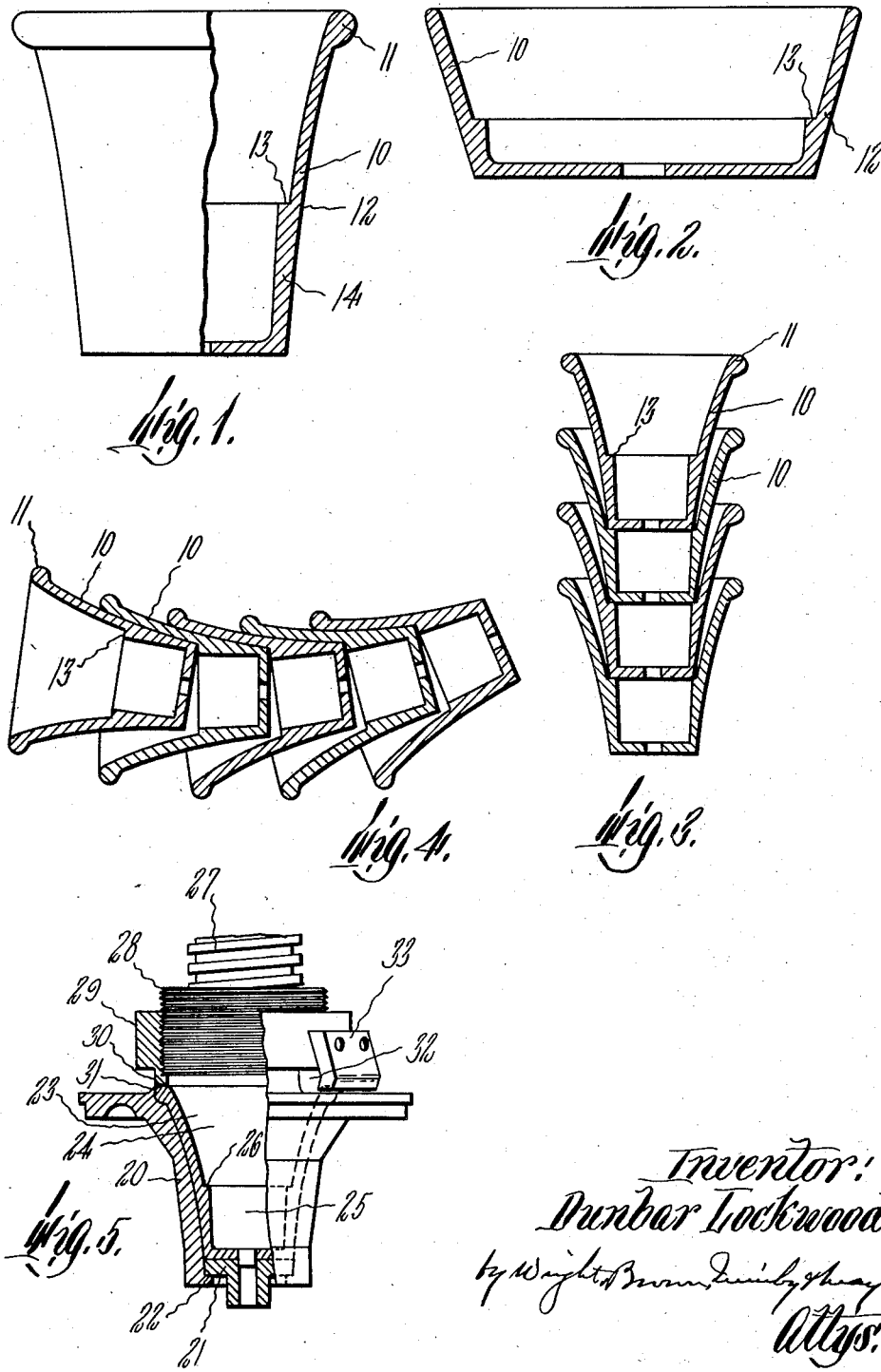

Patented Aug. 21, 1934

1,971,075

UNITED STATES PATENT OFFICE 1,971,075

FLOWERPOT

Dunbar Lockwood, Boston, Mass., assignor to A. H. Hews & Co., Incorporated, Cambridge, Mass., a corporation of Massachusetts Application September 17, 1930, Serial No. 482,428

3 Claims. (Cl. 47—34)

This invention relates to earthen pottery, such as flower pots and the like, adapted to be stacked for shipment or storage. The well known conventional flower pot now on the market has an inner surface which is frusto-conical from the upper rim to the bottom. The outer surface starts with a nearly cylindrical shape and extends downwardly to a shoulder below which this surface extends to the bottom of the pot in a frusto-conical shape. The cylindrical portion of the outer surface results in a material thickening of the pot from the upper rim down to the lateral shoulder, the maximum thickness being at the shoulder itself. This shoulder is adapted to rest on the rim of another pot in which the pot may be nested in stacking a series of them. The shoulder must be of considerable width else it is easily chipped, thus disfiguring the pot and rendering it unsalable as a first quality article. Pots of this kind are customarily made by inserting a ball of soft plastic clay in a hollow conical mold. A cooperating mold is inserted into the hollow mold pressing the clay into shape between the two parts of the mold and causing the clay to flow upwardly between the opposed surfaces of the parts of the mold until the space between these parts is completely filled when the inner part of the mold reaches its final position relative to the outer part of the mold.

In order to insure a sufficient supply of material for each pot, it is customary to put in a small excess, this excess clay being extruded between the edges of the mold members which nearly meet when the members reach their final molding position. In order to facilitate the formation of the pot within the mold one of the members is customarily rotated relatively to the other. When the pot has been molded to shape, the upper mold member is withdrawn and the pot is raised from the lower mold member by means of a movable bottom which rises and pushes the pot clear. At this stage the clay is still soft and plastic so that great care must be used in handling the pot to prevent injury to the same. The pot is carefully lifted from the mold and placed on a suitable support to dry, if properly formed and free from defects in molding. When dried the pot is "fired" or baked to harden the material therein.

It is an object of the present invention to provide a pot which can be made with a considerable saving of material over the conventional pot now commonly in use, which can be made more rapidly by reason of a considerable reduction in defective pots, which is of such a shape as to be more easily molded by the molding machinery, which is more easily and safely handled in being transferred to the drying platform, which is of a general shape more pleasing to the eye, and which lends itself to exterior decoration for an ornamental product. These advantages are attained by shaping the pot with a curving taper on its exterior surface extending from the upper rim down to the bottom. A reinforcing bead may be formed at the upper rim, but this is not essential. The inner surface follows the shape of the outer surface from the top more than half way to the bottom, the precise distance from the top being dependent upon the general shape and taper of the pot. At this point the inner wall extends abruptly inward, forming a narrow shoulder or shelf, the outer diameter of which is slightly greater than the diameter of the bottom of the pot. From this shelf the inner surface extends downwardly to the bottom of the pot, the shape of this portion of the surface approximately following the shape of the exterior surface. The inner shoulder of the pot is adapted to receive and support the bottom of another pot which may be nested within the pot. Since the shoulder is in an inconspicuous place, it is not material whether it becomes chipped or not, so that extra wall thickness immediately below the shoulder to prevent chipping is not needed. The exterior surface of the pot may present an unbroken curve tapering from the top bead to the bottom, this contour being pleasing to the eye and being adapted to receive ornamentation. This shape is also advantageous in the manufacture of the pot since it fits better into the hands of an operator than a straight taper and facilitates the safe transfer of the freshly molded pot from the mold to the drying platform so that, by reason of this curved tapering shape, the minimum thickness of the pot may be somewhat less than would be necessary in the case of a stricly conical taper on the outside surface.

For a more complete understanding of the invention reference may be had to the description thereof which follows and to the drawing of which,—

Figure 1 is an elevation of a pot embodying the invention, a portion being broken away to show one wall of a pot in section.

Figure 2 is a sectional view of a pot of somewhat different shape having an inner shelf.

Figure 3 is a sectional view of a number of pots stacked one within the other.

Figure 4 is a sectional view of a stack of pots in position for carrying by hand.

Figure 5 is a side elevation, partly broken away and in section, of mechanism for making pots such as are illustrated in Figure 1.

In Figure 1 is illustrated a pot having an exterior surface with a downwardly curving concave taper extending from a bead at the lip of the pot down to the bottom of the pot. The upper portion 10 of the side wall of the pot is preferably of uniform thickness from the bead 11 to a point 12 where the inner surface of the wall extends abruptly inward to form a narrow horizontal shoulder 13 adapted to receive and support the bottom of a similar pot nested therein. From the shoulder 13 the wall 14 diminishes slightly in thickness downwardly until it joins the bottom of the pot. The exterior curved taper fits the hands of an operator so that freshly molded pots may be more easily and safely transferred from the mold to the drying platform. This permits a thinner upper portion 10 of the wall than would otherwise be practically possible. The bead 11 serves to reinforce and strengthen this thin upper portion without adding much to the weight of the pot. Since the shoulder 13 is inside the pot instead of on the outside, as in the case of pots now commonly sold, chipping of this shoulder does not render the pot unsightly and unsalable, so that the shoulder need not be made of extra width to avoid chipping. By forming a narrow shoulder, a considerable saving of weight and material in the wall below the shoulder may be effected. This saving, in comparison with a pot with an outside shoulder, is increased by the fact that what extra thickness there is comes within the pot and at the lower end so that the thickening comes on a much smaller diameter than in the case of an exterior thickening at the upper end of the pot. In this way a pot shaped according to the present invention makes possible a saving of over twenty-five per cent in weight and material over the conventional flower pot. This economy in clay and the lubricating oil which is mixed with the clay is very material, as is also the lower transportation cost due to lighter weight.

A further economy is obtainable in the power required for the molding step. The ball of clay which is placed in the bottom of the hollow mold member is forced into the shape of a finished pot by the descent of the upper mold member. In the case of the conventional flower pot, this means that sufficient clay must flow upwardly from the lower portion of the hollow mold member to form the thickened upper portion of the pot. As this thickened upper portion contains a relatively large amount of material, considerable force is required on the part of the descending mold member to cause the clay to flow upwardly. In the case of a pot made according to the present invention the thickened portion of the pot wall is near the bottom of the pot, i. e. where the clay is originally placed in the mold, hence only a relatively small quantity of clay must flow upwardly to form the thin upper portion 10 of the side wall of the pot. The bead 11 does not contain much material and may be made smaller than shown on the drawing. This results in a marked saving in the power required to operate the molding machinery and also saves materially in wear and tear of the apparatus.

After the molding operation, the pot must be allowed to dry before it is fired, the drying of a thin portion of the pot proceeding more rapidly than the drying of a thickened portion so that excessive thickness or thinness of wall must be avoided as otherwise cracks are liable to occur. The pot embodying the present invention has an upper portion 10 of its side wall of uniform thickness. The lower portion 14 is somewhat thicker, but the difference is small, with the result that the percentage of pots which crack during the drying is greatly reduced in the case of a pot embodying the present invention. The output of salable pots is thus greatly increased without operating the machinery at a higher speed by this reduction in the percentage of defective pots. This reduction arises, first, from the greater ease with which the ball of clay is pressed into the improved shape of the pot; second, from the increased strength and adaptability of the pot to safe handling while moist resulting from the curved taper of the exterior surface; and third, the small difference in thickness of the various portions of the wall of the pot, which does away largely with the cracking of pots in drying.

Apparatus for making pots such as are illustrated in Figure 1 is shown in Figure 5. This comprises a hollow mold member 20 having a movable bottom 21 resting on a shoulder 22 within the side wall of the mold member 20. The inner mold member has a tapering body portion 24 and a lower reduced portion 25, these portions being separated by a step shoulder 26. This inner mold member is provided with an outwardly extending threaded stem 27 by which it may be fixed to a reciprocable rotatable head (not shown), by which the inner mold member may be moved into the hollow member 20 to cause the clay therein to flow upwardly so as to fill the clearance between the two mold members. The inner mold member may also be provided with a threaded portion 28 on which a collar 29 is threaded for vertical adjustment, the collar having a lower portion 30 cooperating with a rim or lip 31 on the hollow mold member to shape the rim of the pots formed within the mold. The excess clay is extruded through the clearance between the lower portion 30 of the collar 29 and the lip 31. In order to trim away this extruded clay and thus to avoid leaving a laterally extending fin on the rim of the pot, I may provide a wiper block 32 of rubber or other suitable soft material, this wiper block being held in place as by a clamp 33 attached to the side of the collar 29. In molding pots with the apparatus described, it is evident that either of the two mold members may be rotated relatively to the other. I find it convenient to rotate the upper member and to hold the hollow member stationary.

I claim:

1. A flower pot having a wall with a downwardly curving concave taper on its exterior surface, and a horizontal shoulder on the inner surface of said wall adapted to receive and support the bottom of a pot of the same size and shape set thereon.

2. A flower pot having a side wall with a downwardly curving taper, and a horizontal shoulder on the inner surface of said wall at a point where the inner diameter of the pot is slightly greater than the outer diameter of the bottom of the pot, the upper portion of said wall above said shoulder being of uniform thickness, the lower portion of the wall below said shoulder being thicker than the upper portion and having its maximum thickness at said shoulder.

3. A flower pot having its outer surface with a downwardly curving taper substantially from top to bottom, said pot having its inner surface with a downwardly curving taper to a point where the inner diameter is slightly greater than the outer diameter at the bottom of the pot, said inner surface being inwardly offset below said point forming a horizontal shoulder and extending perpendicularly downward from said shoulder to the bottom of the pot.

DUNBAR LOCKWOOD.